US010287526B2

(12) United States Patent
Erdemir et al.

(10) Patent No.: US 10,287,526 B2
(45) Date of Patent: *May 14, 2019

(54) METHOD TO PRODUCE CATALYTICALLY ACTIVE NANOCOMPOSITE COATINGS

(71) Applicant: UChicago Argonne, LLC, Chicago, IL (US)

(72) Inventors: Ali Erdemir, Naperville, IL (US); Osman Levent Eryilmaz, Plainfield, IL (US); Mustafa Urgen, Istanbul (TR); Kursat Kazmanli, Istanbul (TR)

(73) Assignee: UChicago Argonne, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/845,936

(22) Filed: Dec. 18, 2017

(65) Prior Publication Data
US 2018/0163155 A1    Jun. 14, 2018

Related U.S. Application Data

(60) Continuation of application No. 15/012,667, filed on Feb. 1, 2016, now Pat. No. 9,845,441, which is a
(Continued)

(51) Int. Cl.
*B01J 27/22* (2006.01)
*B01J 27/24* (2006.01)
(Continued)

(52) U.S. Cl.
CPC ............ *C10M 169/04* (2013.01); *B01J 27/22* (2013.01); *B01J 27/24* (2013.01); *B01J 35/002* (2013.01); *B01J 37/347* (2013.01);
*B01J 37/349* (2013.01); *C10M 103/04* (2013.01); *C10M 125/02* (2013.01); *B01J 37/0225* (2013.01);
(Continued)

(58) Field of Classification Search
CPC .............. C10M 103/04; C10M 169/04; C10M 2201/05; C10M 2201/061; C10M 2201/087; C10N 2210/01; C10N 2210/02; C10N 2210/03; B01J 27/22; B01J 27/24; B01J 35/002; B01J 37/0225; B01J 37/347; B01J 37/349
See application file for complete search history.

(56) References Cited

U.S. PATENT DOCUMENTS 7,211,323 B2  5/2007 Erdemir et al.
7,353,525 B1  4/2008 Dorbeck et al.
(Continued)

OTHER PUBLICATIONS

U.S. Final Office Action for U.S. Appl. No. 13/250,760, dated Dec. 5, 2014, 7 pages.
U.S. Notice of Allowance for U.S. Appl. No. 13/250,760, dated Oct. 2, 2015, 8 pages.
(Continued)

*Primary Examiner* — James C Goloboy
(74) *Attorney, Agent, or Firm* — Foley & Lardner LLP

(57) ABSTRACT

A nanocomposite coating and method of making and using the coating. The nanocomposite coating is disposed on a base material, such as a metal or ceramic; and the nanocomposite consists essentially of a matrix of an alloy selected from the group of Cu, Ni, Pd, Pt and Re which are catalytically active for cracking of carbon bonds in oils and greases and a grain structure selected from the group of borides, carbides and nitrides.

20 Claims, 15 Drawing Sheets

Related U.S. Application Data division of application No. 13/250,760, filed on Sep. 30, 2011, now Pat. No. 9,255,238.

(51) Int. Cl.
    *B01J 35/00*    (2006.01)
    *B01J 37/02*    (2006.01)
    *B01J 37/34*    (2006.01)
    *C10M 103/04*    (2006.01)
    *C10M 125/02*    (2006.01)
    *C10M 169/04*    (2006.01)

(52) U.S. Cl.
CPC ... *C10M 2201/05* (2013.01); *C10M 2201/061* (2013.01); *C10M 2201/087* (2013.01); *C10N 2210/01* (2013.01); *C10N 2210/02* (2013.01); *C10N 2210/03* (2013.01)

(56) References Cited

U.S. PATENT DOCUMENTS

| | | | |
|---|---|---|---|
| 7,509,993 | B1 | 3/2009 | Turng et al. |
| 7,846,556 | B2 | 12/2010 | Erdemir et al. |
| 7,961,427 | B2 | 6/2011 | Dorbeck et al. |
| 9,255,238 | B2 * | 2/2016 | Erdemir .......... B01J 27/22 |
| 9,845,441 | B2 * | 12/2017 | Erdennir .......... B01J 27/22 |
| 2009/0155479 | A1 * | 6/2009 | Xiao .......... C23C 4/06 |
| | | | 427/451 |

OTHER PUBLICATIONS

U.S. Office Action for U.S. Appl. No. 13/250,760, dated Jul. 16, 2014, 9 pages.

U.S. Office Action for U.S. Appl. No. 13/250,760, dated May 20, 2015, 8 pages.

* cited by examiner

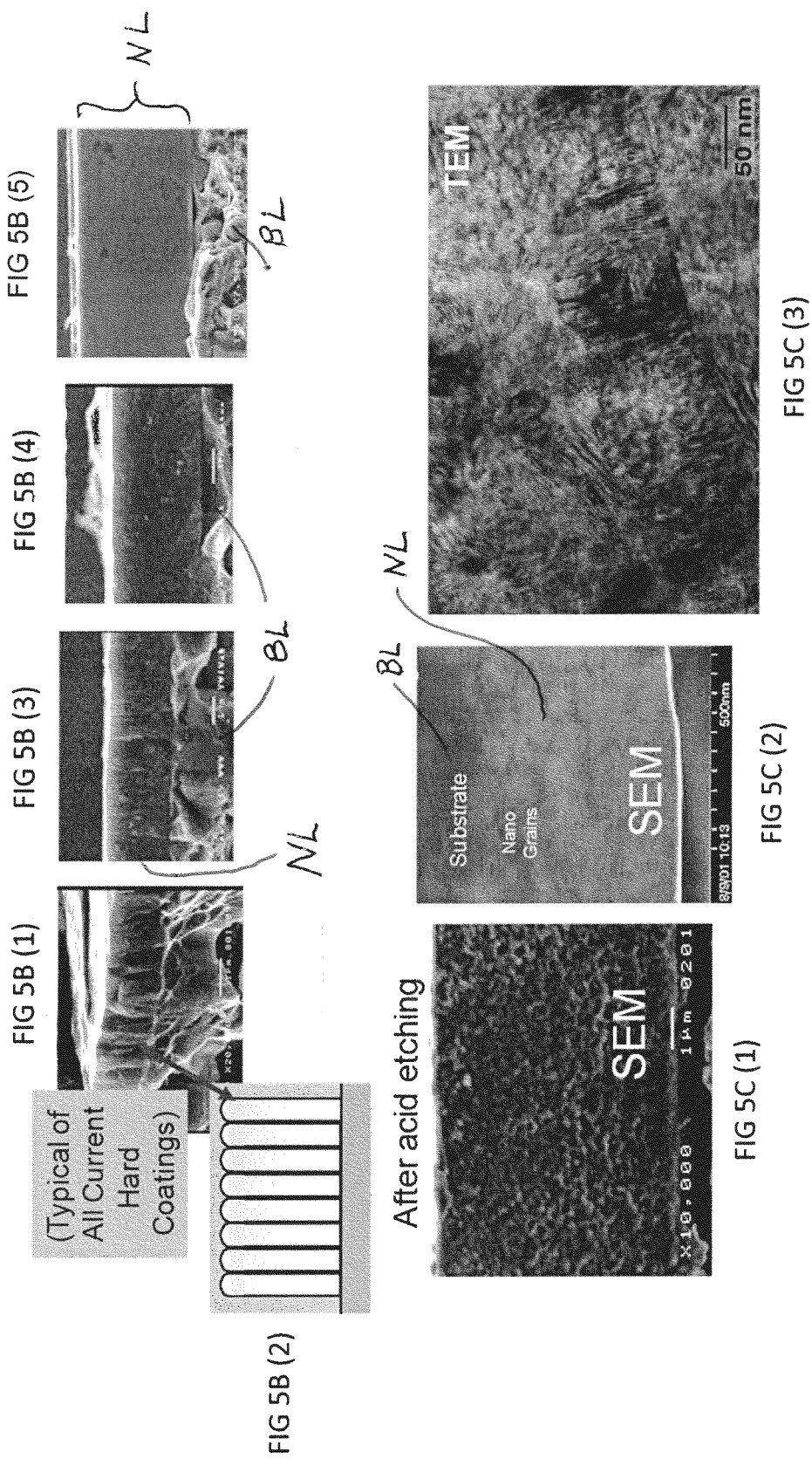

US 10,287,526 B2

METHOD TO PRODUCE CATALYTICALLY ACTIVE NANOCOMPOSITE COATINGS

CROSS-REFERENCE TO RELATED PATENT APPLICATIONS

This application is a Continuation of U.S. application Ser. No. 15/012,667, filed Feb. 1, 2016, which is a Divisional of U.S. application Ser. No. 13/250,760, filed Sep. 30, 2011, the content of which are incorporated herein by reference in their entirety.

STATEMENT OF GOVERNMENT INTEREST

The United States Government claims certain rights in this invention pursuant to Contract No. W-31-109-ENG-38 between the United States Government and the University of Chicago and/or pursuant to DE-AC02-06CHI1357 between the United States Government and UChicago Argonne, LLC representing Argonne National Laboratory.

FIELD OF THE INVENTION

The present invention relates to coating materials and methods of manufacture thereof. More particularly the invention relates to catalytically active nanocomposite coatings and methods of manufacture to provide low friction surface layers for a variety of lubricant uses, such as for engines.

BACKGROUND OF THE INVENTION

Current engine oils and greases typically include additives to enhance lubrication properties. Such additives include, for example, the well known additive ZDDP and MoTDC. However, these additives are very harmful to effective operation of catalytic converters and other after treatment devices for engines using such additive containing lubricants. The result is incomplete and ineffective operation of such devices which causes environmental pollution. Consequently, there is a substantial need to eliminate use of such additives in lubricants while still providing excellent engine operation and wear resistance while avoiding environmental pollution.

SUMMARY OF THE INVENTION

Compositions of coatings and methods of manufacture are directed to nanocomposite coatings with high catalytic reactivity to provide excellent lubrication properties between materials sliding relative to one another. These coatings cause catalytic activity which cracks long chain hydrocarbon molecules in base lubricating oils and greases to form a slick and highly protective (high wear and scuff resistance) carbon based film for sliding surfaces. Analyses show the film is carbon based and are structurally similar to ultra-low friction carbon films such as are described in U.S. Pat. No. 6,548,173 which is incorporated by reference herein. The subject nanocomposite coatings are catalytically active metal alloys, including alloys of metals such as, for example, Cu, Ni, Pd, Pt and Re as the matrix and grains of transition metal and refractory metal nitrides, carbo-nitrides, carbides or borides. Various examples of preformed alloy compositions are described hereinafter. Such nanocomposite coatings provide excellent scuffing and wear resistance without need for the use of deleterious additives.

These and other objects, advantages, and features of the invention, together with the organization and manner of operation thereof, will become apparent from the following detailed description when taken in conjunction with the accompanying drawings.

BRIEF DESCRIPTION OF THE DRAWINGS

FIG. 5B(1) shows an SEM micrograph of a nanocomposite layer ("NL"); FIG. 5B(2) shows a schematic of the typical columnar growth of such layers; FIG. 5B(3) shows the nanocomposite layer deposited on a base layer ("BL"); FIG. 5B(4) shows a layer magnification view of 5B(3) and FIG. 5B(5) shows yet a layer magnification of 5B(3); FIG. 5C(1) shows a high magnification view of the BL portion after acid etching; FIG. 5C(2) shows yet another high magnification view of the BL and NL portions; and FIG. 5C(3) shows a transmission electron microscope view of the nanocomposition layer at high magnification;

FIG. 10B shows the raw diffraction pattern from the LDC film and FIG. 10C shows an EELS spectrum of the LDC film.

DETAILED DESCRIPTION OF THE PREFERRED EMBODIMENTS

The invention is directed to methods of preparation of catalytically active nanocomposite coatings. Rather than add lubricant additives, which have substantial deleterious effects, the method of the invention concerns depositing of catalytically active metal based films on engine or machine parts which are in contact and moving while in contact. Various catalytically active coatings are therefore deposited by any one of various conventional deposition methodologies, such as, PVD, CVD and ALD. Such selected hard/soft-phase nanocomposite coatings enable substantial improvement of scuff and wear resistance for engine or machinery with sliding contact.

Figure 1:
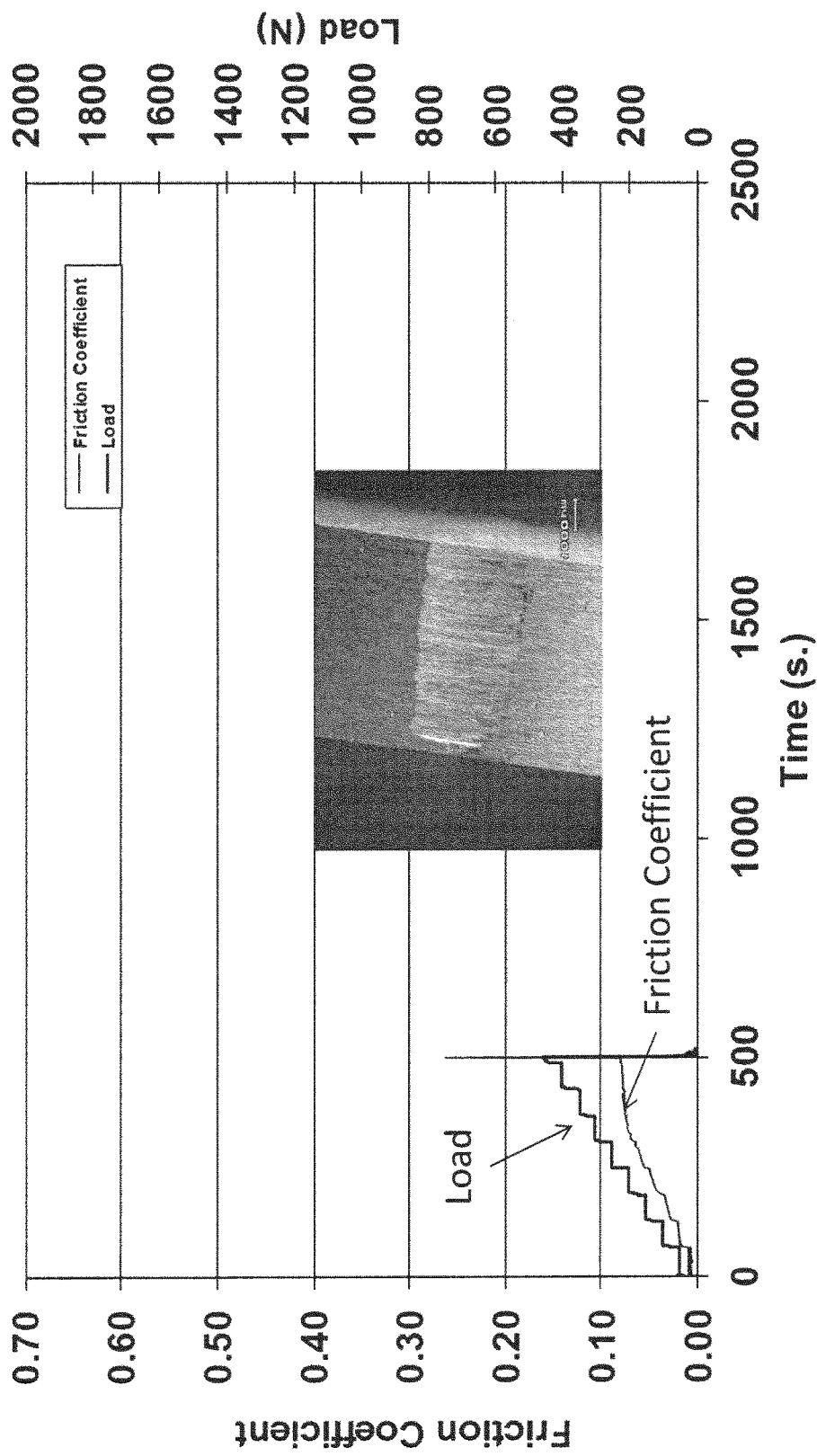
FIG. 1 illustrates scuffing performance of a steel/steel test pair in synthetic PAO oil and also on insert micrograph of the wear area B60315B Scuffing Steel vs steel PAO10.
Figure 2:
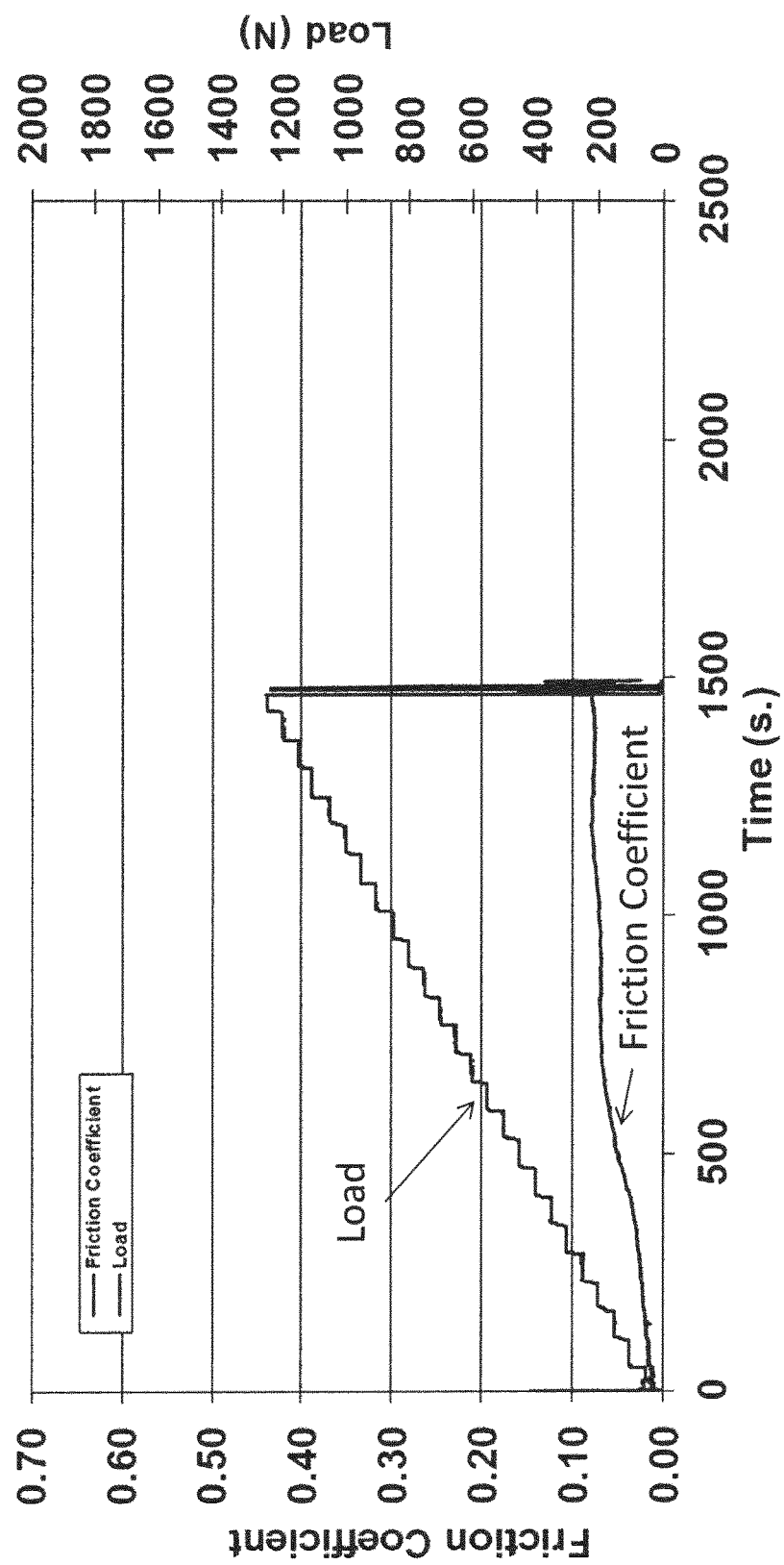
FIG. 2 illustrates scuffing performance of a 0.5% ZDDP/PAO-10 synthetic oil mixture (B60317A Scuffing2 C60314 Low SHC vs Low SHC PAO10)
Figure 3A:
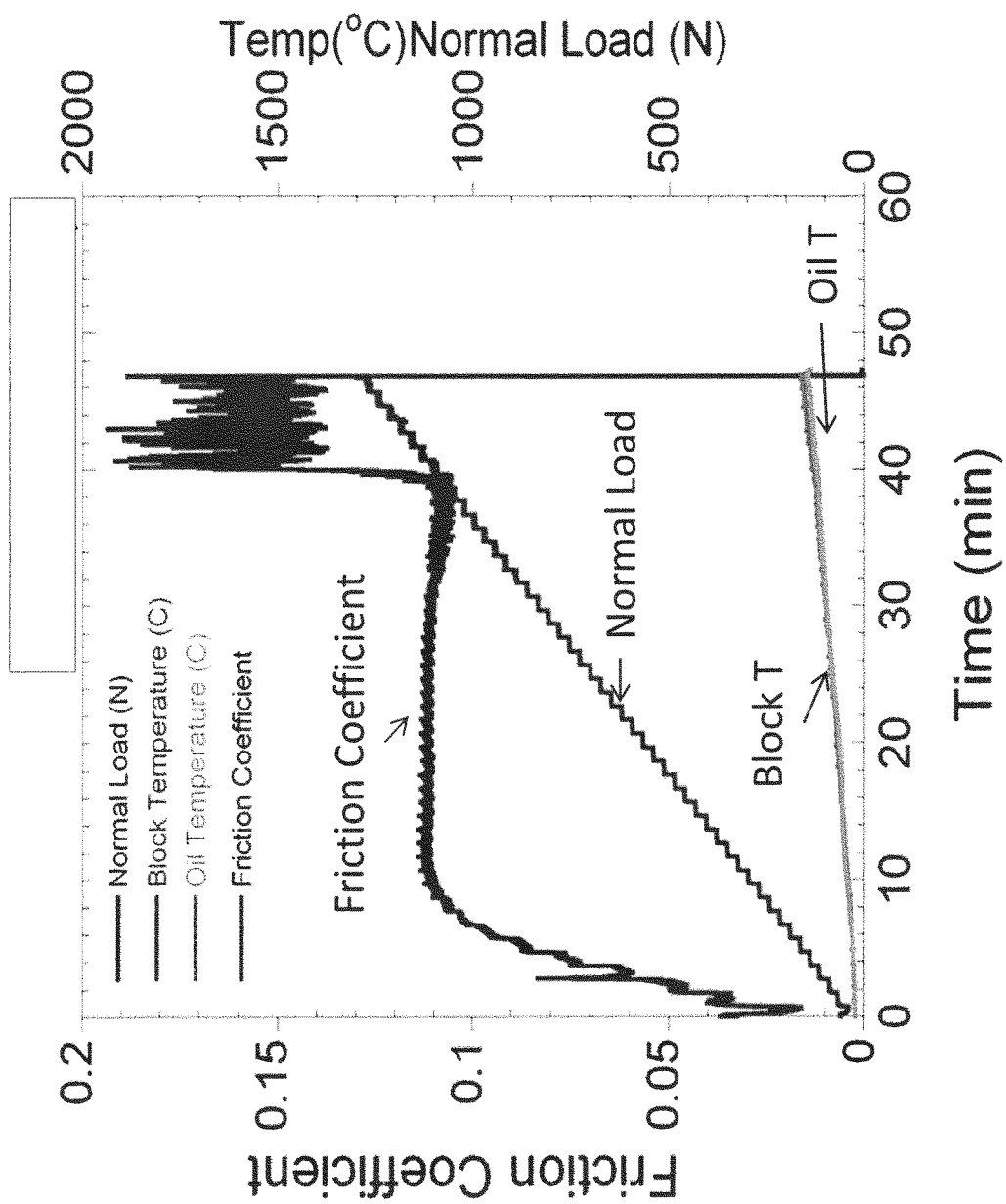
FIG. 3A illustrates scuffing performance of a steel/steel test pair in fully formulated Mobil 1 oil (090202C Mobil 1 5w40 H60 fs 10 1000 rpm)
Figure 3B:
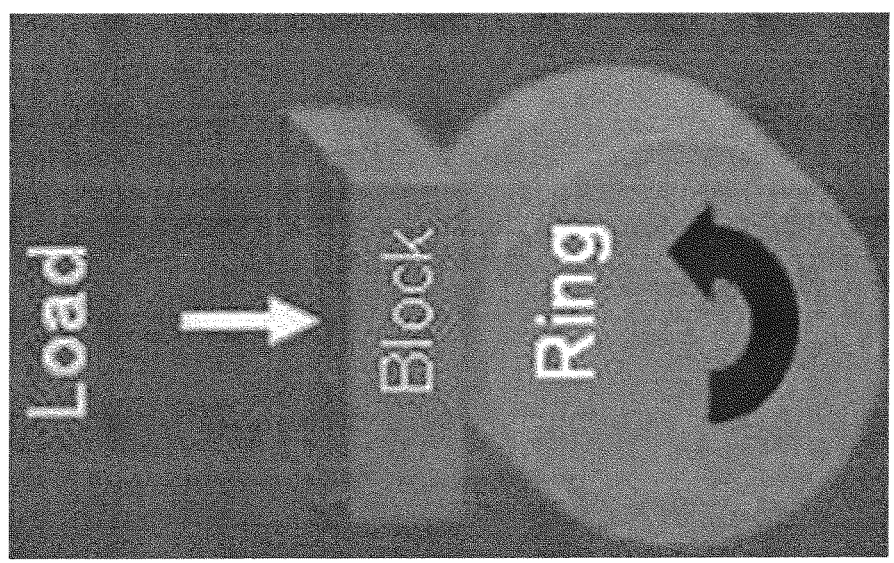
FIG. 3B illustrates a schematic of the test pair.
Figure 3C:
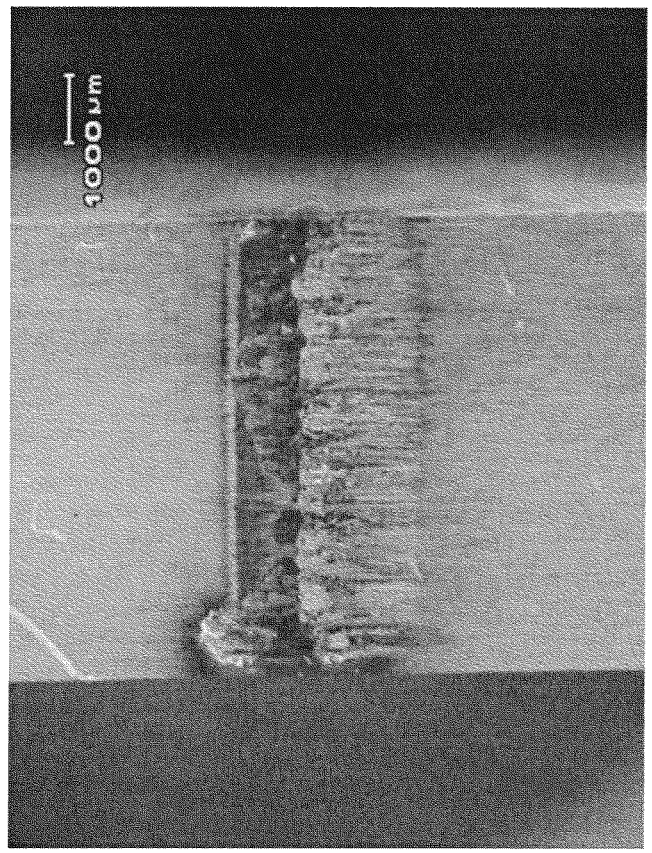
FIG. 3C shows the mechanical scuffing on the block side.

In FIG. 1 is shown the scuffing performance of a steel on steel test pair in a conventional pure synthetic oil (PAO). As can be seen from the data, the steel/steel pair undergoes substantial, rapid scuffing at a load of 400 Newtons "(N)". In FIG. 2, it can be seen that the addition of a conventional additive, 0.5% ZDDP-containing PAO oil, causes the scuffing behavior to improve dramatically. In FIG. 3 is shown data for fully formulated engine oil, such as Mobil 1; and the scuffing load is increased to about 1400 N. Such an oil is fully formulated with several oil additives, including ZDDP and MoTDC. This can be compared to the performance in FIG. 1 showing a substantial improvement thereover.

Figure 4:
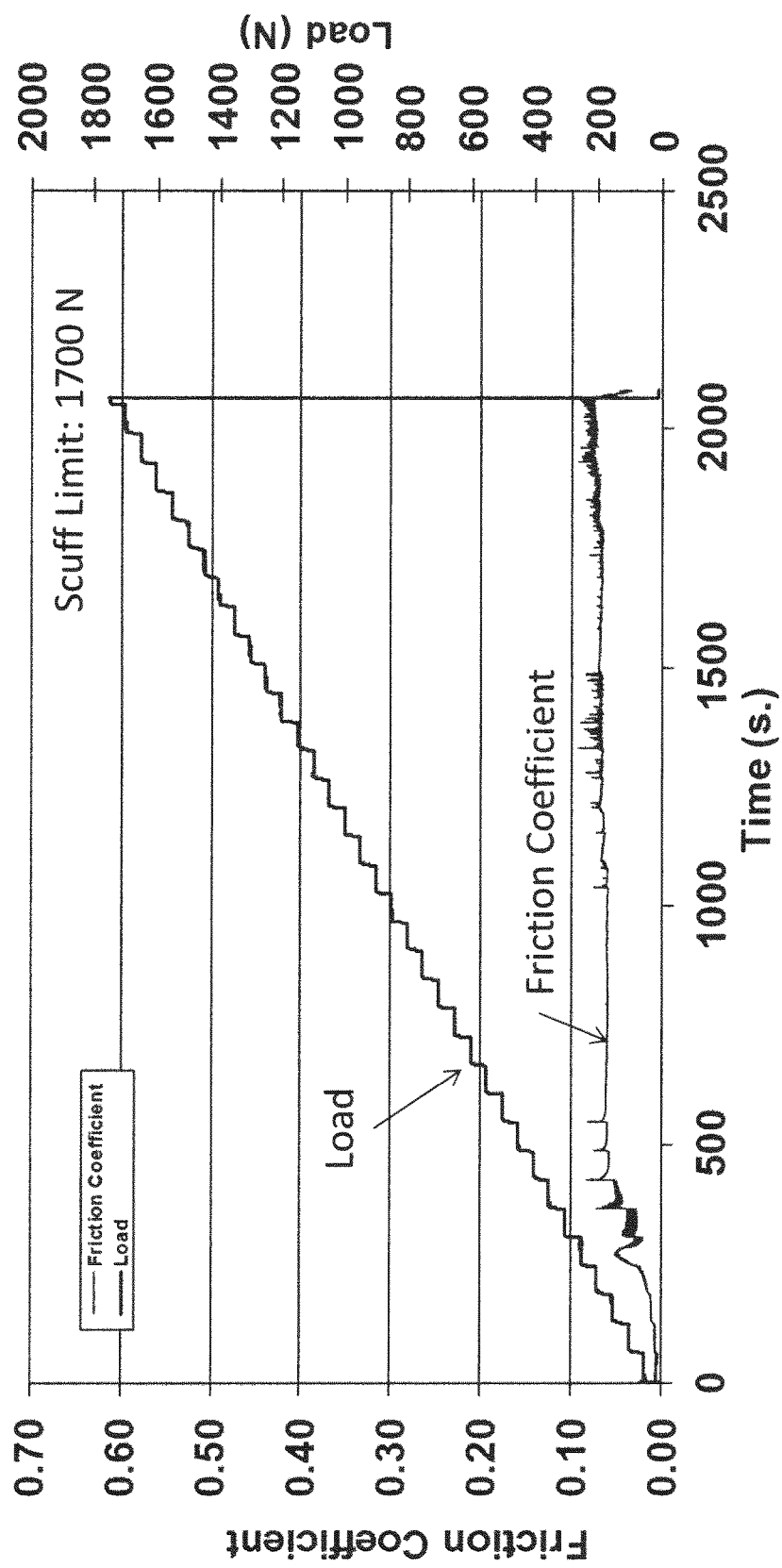
FIG. 4 illustrates scuffing performance of a coating of an embodiment of the invention on a steel/steel test pair with pure PAO oil (B60317A Scuffing2 C60314 Low SHC vs Low SHC PAO100.
Figure 5A:
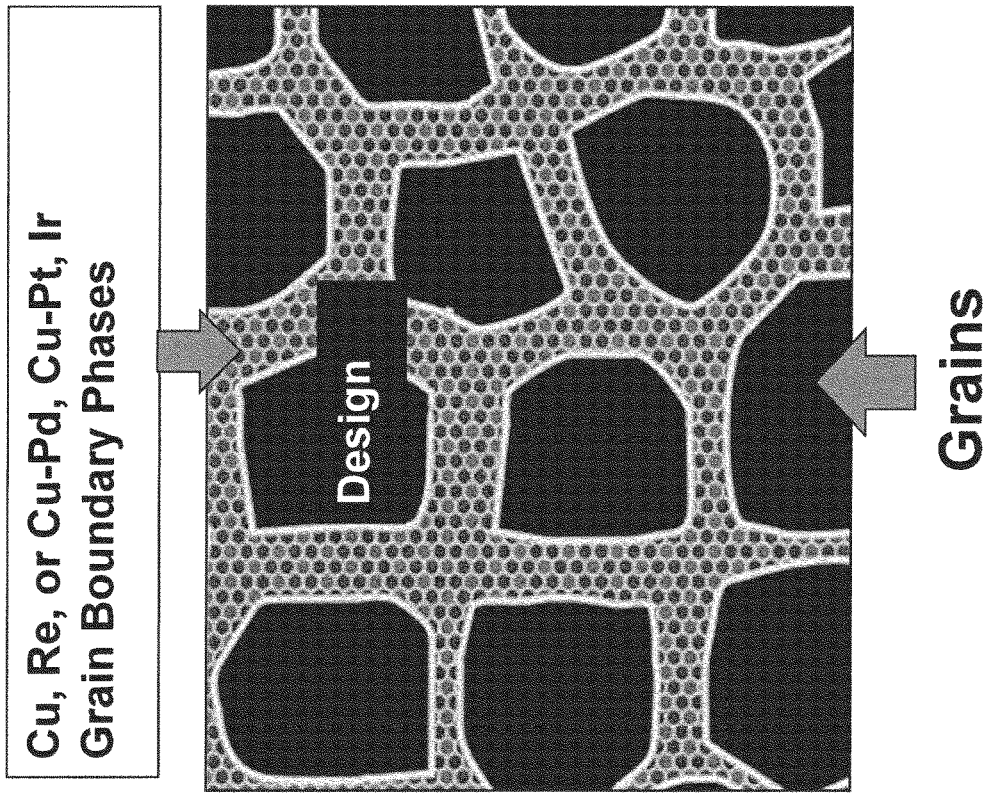
FIG. 5A is a schematic illustration of a preferred form of a nanocomposite microstructure with MoN grains and grain boundaries of catalytically active metal alloys of the invention.

In order to overcome the disadvantages of such additives, the engine or machine components can be coated at selected friction points, to provide a film which is a nanocomposite of catalytically active ingredients, generally including one or more of Cu, Ni, Pd, Pt and Re as a matrix and grains of a transition or refractory metal nitride, carbide, carbo-nitrides and borides. As shown in FIG. 4, a nanocomposite coating of formulation MoN—Cu (with 2 wt. % Cu) results in greatly improved scuffing performance even compared to Mobile 1, generally acknowledged as the best engine oil available. As shown in FIG. 5, the coating has a preferred microstructure with nano-sized grains, such as, for example, a molybdenum nitride phase with grain boundaries of the catalytically active metal phase, such as, Cu, Ni, Pd, Pt, and Re, and alloy combinations thereof. The weight percentages of the most preferred nanocomposite includes about 1-10% by weight for the matrix and 90-99% by weight the nano-sized grains. Tests performed on various nanocomposites also determined that the alloy composition must be adjusted to compositions which achieve a threshold catalytic activity which enables cracking of the carbon chain in the oil used to create the diamond-like carbon material at the wear interface.

Figure 6A:
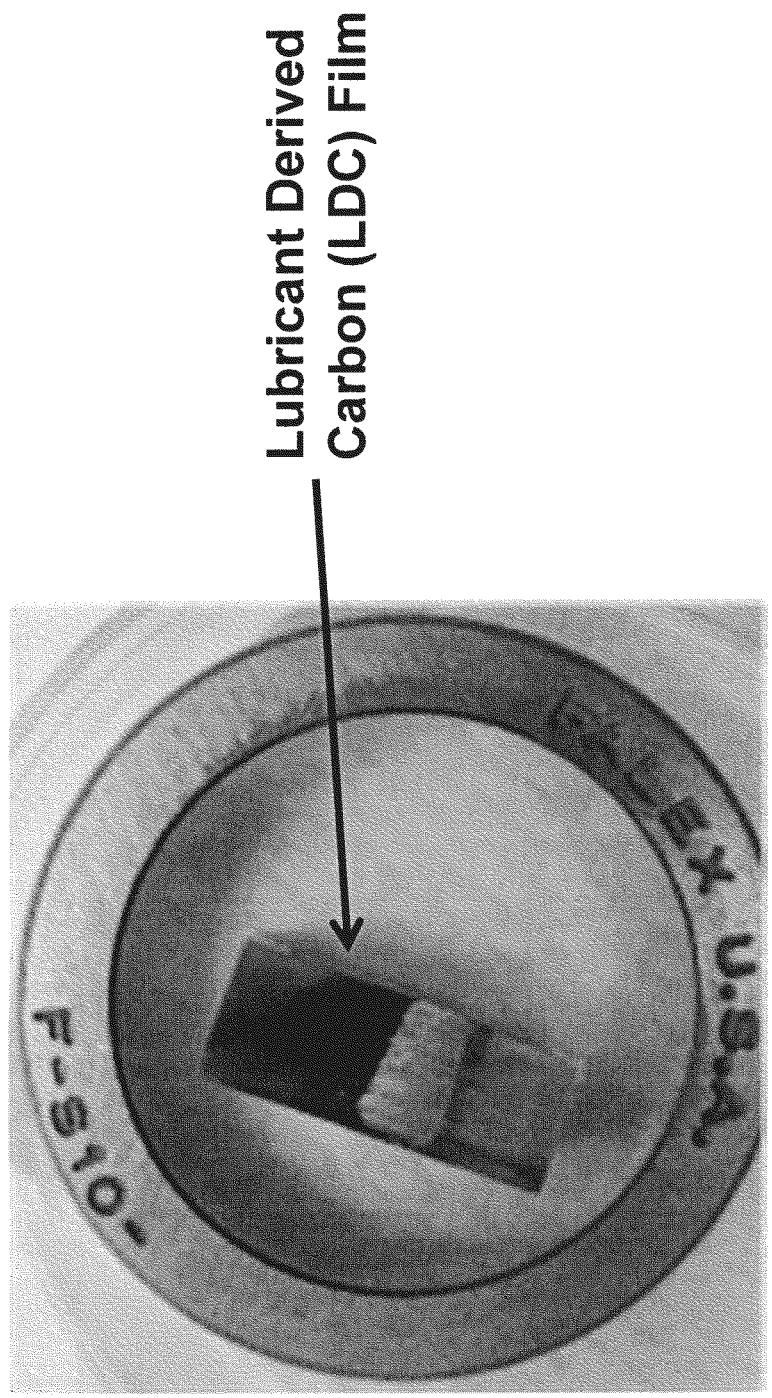
FIG. 6A illustrates a block on ring wear scuff test system with a black, shiny carbon based film on the surface undergoing wear testing.
Figure 6B:
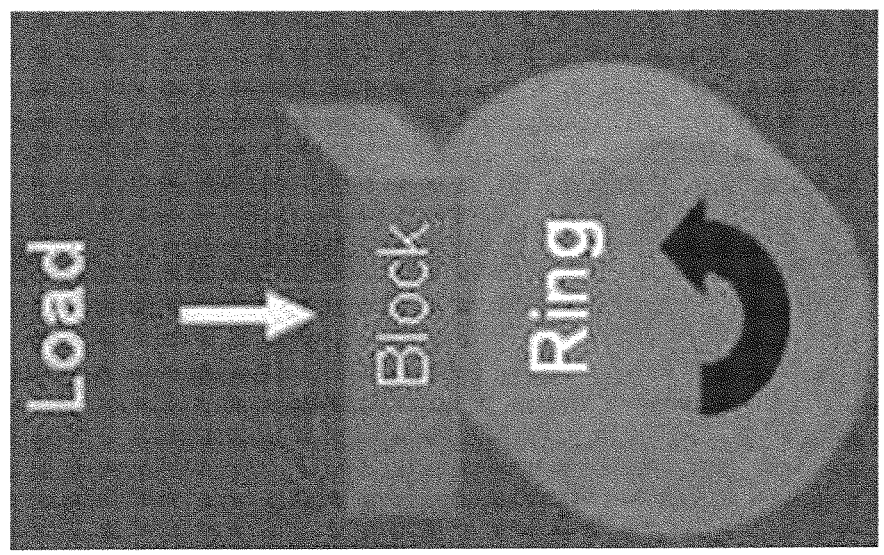
FIG. 6B illustrates a schematic of the test system.
Figure 6C:
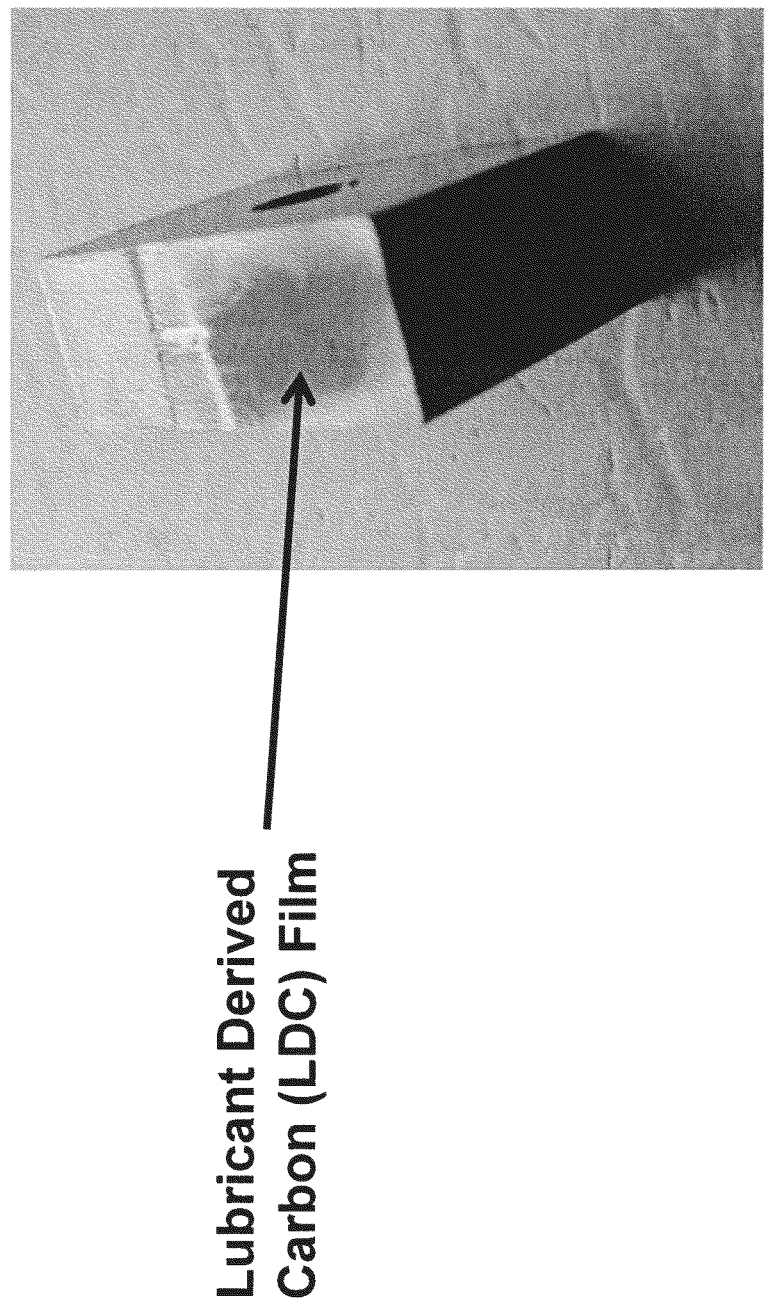
FIG. 6C illustrates a layer of lubricant derived carbon film on the test block.

In order to evaluate the nature of the coating, tests were performed on a metal test component as shown in FIG. 6. Tests were performed on rubbing surfaces on a block side of a steel test pair which provided the performance data of FIG. 4. The surfaces of the sliding test pair exhibited a shiny film.

Figure 7:
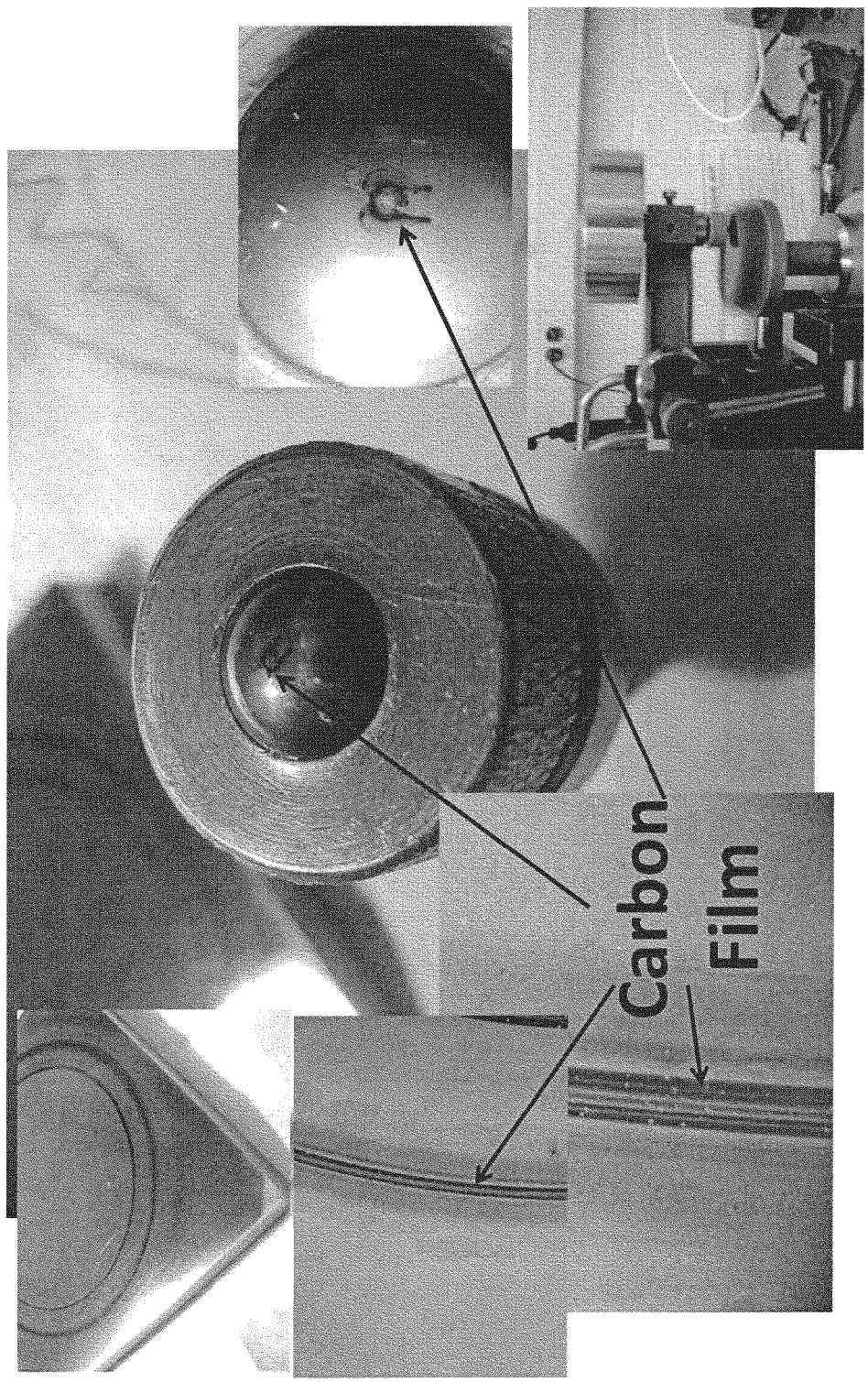
FIG. 7 illustrates a lubricant derived carbon based film formed on the ball and disk sides of a steel test pair having a catalytically active coating (C60314 Low SHC Flat vs C60314 Low SHC Ball (9.5 mm Rad) Pure PAO 10, 20 N load, 50 rpm, 38 mm track diameter CS60328A—Starved Condition)

Likewise, such a shiny film was formed in the test system of a sliding surface of a ball and disk shown in FIG. 7 in which pure PAO-10 oil was the lubricant used. The shiny film was examined using Raman spectroscopy, and the Raman features of FIG. 8 are quite similar to that of a diamond-like carbon film.

Figure 8:
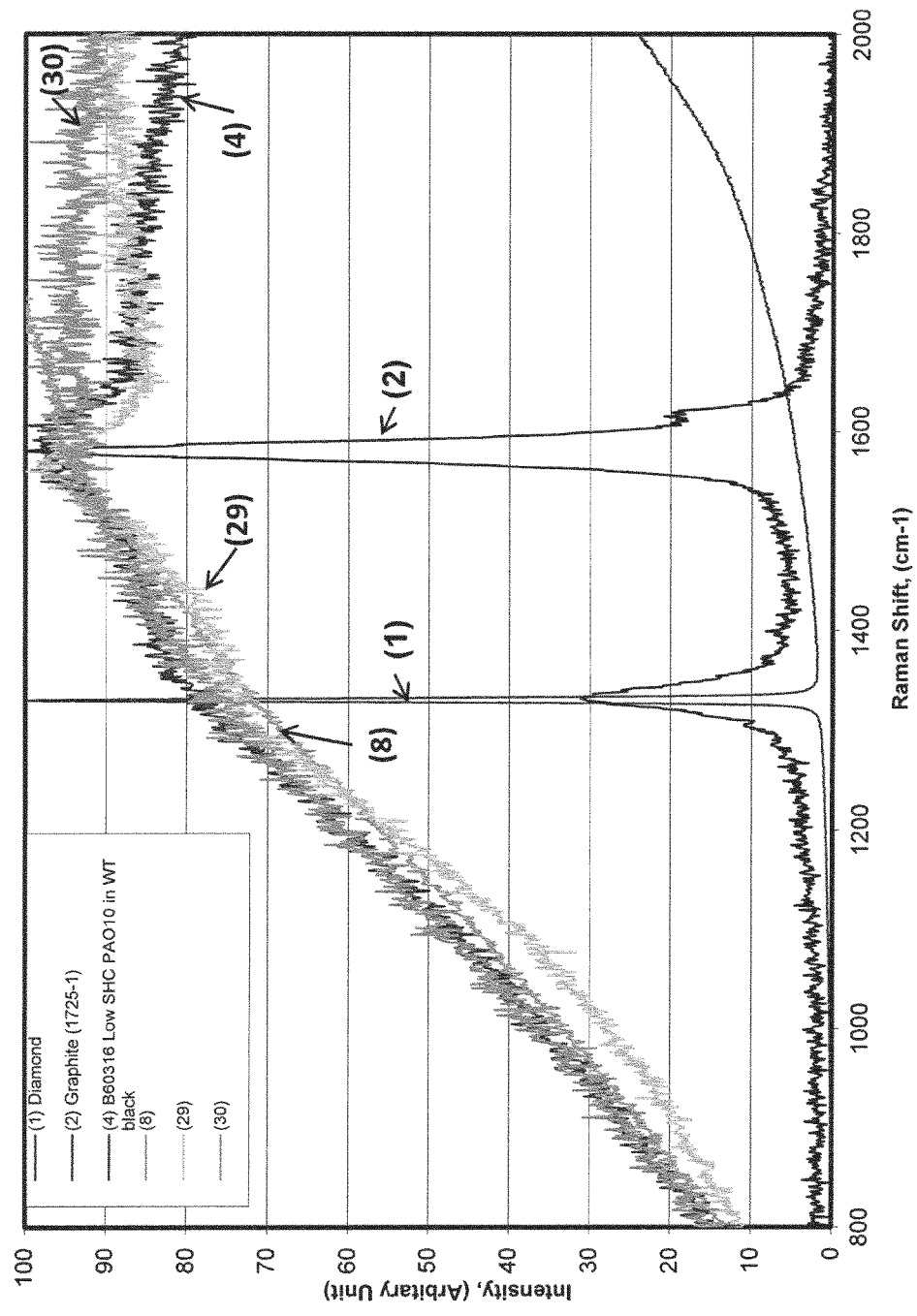
FIG. 8 illustrates Raman spectra of a carbon film (labeled curve 4) formed on a wear track of a disk coated with catalytically active coatings tested in pure PAO-10 base oil and also shown are comparison spectra of diamond (1), graphite (1725-1) labeled curve (2), LDC film B60316 low SHC PAO10 in WT test, an LDC film (8), an LDC film (29) and an LDC film (30)

In FIG. 8, B60316 is an internal experiment number for reference purposes only. Low SHC is the coating tested. It is made out of Mo—N—Cu produced by the PVD method. The numbers 8, 29 and 30 in the figures are for Raman spectrum taken from the black area after a block on ring tribology test, showing that the test produces Diamond Like Carbon species on the tested surfaces.

Figure 9:
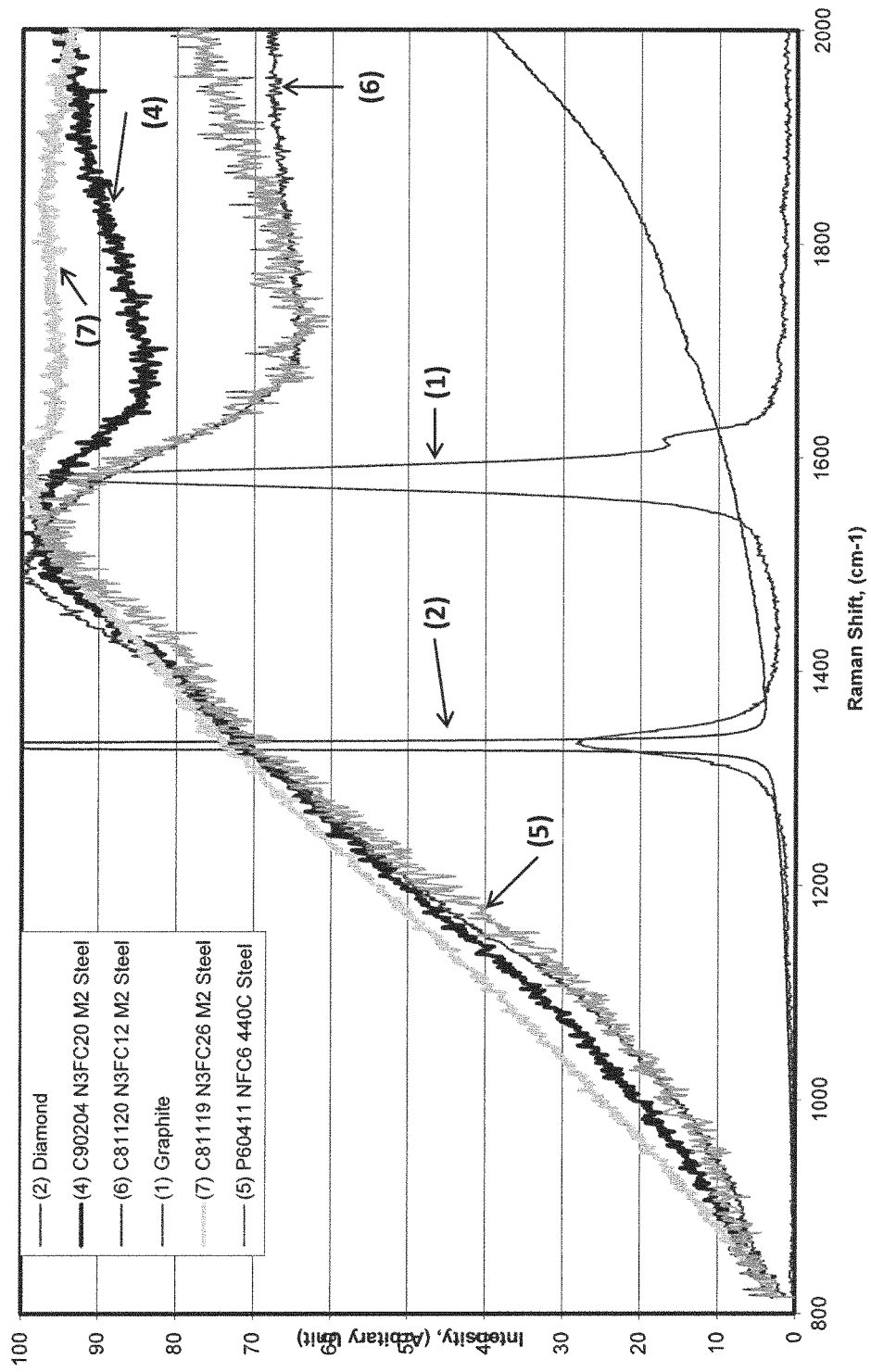
FIG. 9 shows further comparison Raman spectra for diamond (2), LDC film (4) C90204 N3 FC20 M2 steel test, LDC film (6) C81120 N3FC12 M2 steel test, graphite (1), LDC film (7) C81119 N3FC26 M2 steel test and LDC film (5) P60411 NFC6 440C steel.

FIG. 9 shows a further comparison of the Raman spectra for crystalline diamond (1), crystalline graphite (1), a conventional graphite; LDC film (4) on test system C90204 N3 FC20 M2 steel; LDC film (6) C81120 N3 FC12 M2 steel; LDC film (7) C81119 N3 FC26 M2 steel; and LDC film (5) P60411 NF C6 440C steel. C90204, C81120, C81119, P60411 and P60411 are internal experimental numbers; and are also reference numbers used to track those coatings in our system. N3FC20, N3FC12 and N3FC26 are hydrogenated Diamond Like Carbon Coatings produced by reactive PVD method. The higher the number (e.g. 12, 20, 26) the higher the $CH_4$ gas flow during the deposition; or the higher the number, the higher the hydrogen content in the LDC film. P60411 is also an internal experiment number. NFC6 also is a Diamond Like Carbon (here LDC layers as described before) coating produced by Plasma Assisted Chemical Vapor Deposition (PA-CVD). All above LDC films are made out of carbon and hydrogen only. M2 steel and 440C steel are well-known steels for the substrate materials.

Diamond and graphite (graphite reference is for a disordered graphite in FIGS. 8 and 9) are used as a Raman reference in the graphs.

Figure 10A:
FIG. 10A shows a TEM micrograph of LDC film particles.
Figure 10B:
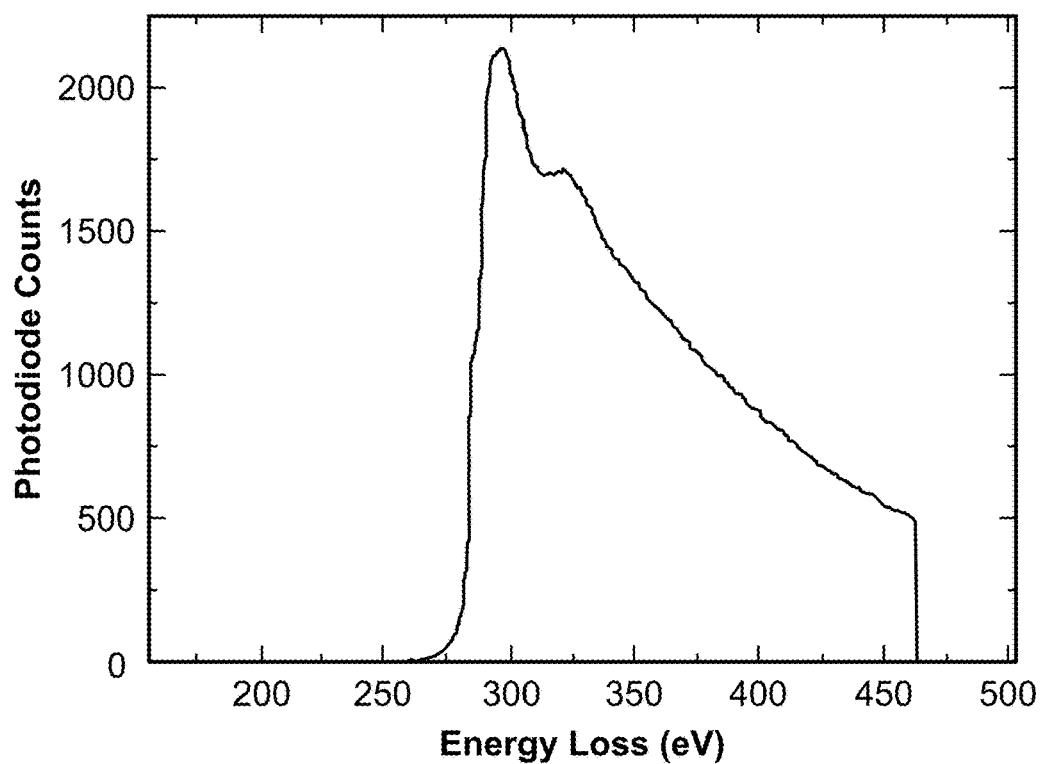

FIG. 10A shows transmission electron microscopy of on LDC film; FIG. 10B shows an electron diffraction pattern of FIG. 10A; and FIG. 10C shows electron energy loss spectrum for FIG. 10A all of which illustrate the DLC character of the product lubricating media produced by use of the nanocomposite in contact with an oil during wear tests. The following non-limiting Example illustrates one method of preparation.

EXAMPLE

This is an example of preparation of a nanocomposite coating of Mo—N—Cu done by Magnetron sputtering.

| | | Process-ID: xxx | |
| | | Cathode 2: Mo | |
| | Cathode 1: Mo—Cu (20% at. Cu) | | |
| Remaining Time (seconds) | Main | Sub | Parameters |
| --- | --- | --- | --- |
| | | Heating | |
| 25200 | Heating_Startpress.[mPa]6 | | |
| | | Roughpump1 | |
| | | Tablespeed[%]15 | |
| | | Turbo1speed[%]100 | |
| | | Heater[W]8000 | |
| | | Press.lim.1[mPa]6 | |
| | | Press.lim.2[mPa]6 | |
| | | Testinterval[s]5400 | |
| 20400 | Heater[W]Heater[W]2500 | | |
| 20400 | Turbo1speed[%]Turbo1speed[%]66 | | |

-continued

Process-ID: xxx
Cathode 2: Mo
Cathode 1: Mo—Cu (20% at. Cu)

| Remaining Time (seconds) | Main | Sub | Parameters |
|---|---|---|---|
| | Etching | | |
| 19800 | Etching_Argon[mln]200 | | |
| | | Turbo1speed[%]66 | |
| | | Tablespeed[%]30 | |
| 19790 | | MF-tableControlmode7 | |
| | | | Setpoint550 |
| | | | Frequency[kHz]240 |
| | | | Rev. time[ns]1600 |
| | Coating | | |
| 16200 | Coating_Argon[mln]150 | | |
| | N2[mln]0 | | |
| | Heater[W]0 | | |
| | Tablespeed[%]30 | | |
| | Turbo1speed[%]66 | | |
| 16190 | DC-tableControlmode7 (Voltage) | | |
| | | Setpoint 200 V | |
| 16190 | DCcathode2[W]DCcathode2[W]2500 | | |
| 16180 | Rampcath | | .2Startvalue[W]2500 |
| | | Endvalue[W]8000 | |
| | | Stepwidth[W]250 | |
| | | Int.val.time[sec]20 | |
| 15680 | DCcathode1[W]DCcathode1[W]500 | | |
| 15670 | Rampcath.1Startvalue[W]500 | | |
| | | Endvalue[W]4000 | |
| | | Stepwidth[W]100 | |
| | | Int.val.time[sec]15 | |
| 15070 | DC-tableControlmode7 (Voltage) | | |
| | | Setpoint 100 V | |
| 15070 | N2Startvalue[mln]150 | | |
| 15060 | Nitrogen control | Set press[mPa] 600 | |
| | Cooling | | |
| 1800 | Cooling_Vent.temp.[° C.]145 | | |

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

The invention claimed is:

1. A method for lubricating materials in wear contact, comprising the steps of:
   providing a base material;
   disposing a nanocomposite coating on the base material, the nanocomposite a microstructural matrix of a catalytically active alloy with grains embedded in the microstructural, and the grains selected from the group of transition metal carbides, transition metal nitrides, transition metal carbo-nitrides, transition metal borides, refractory metal carbides, refractory metal nitrides, refractory metal carbo-nitrides, refractory metal borides;
   disposing an oil on the nanocomposite coating;
   engaging the nanocomposite coating with a surface, the oil disposed therebetween; and
   forming a carbon film disposed between the coating and the surface, thereby lubricating the nanocomposite coating.

2. The method as defined in claim 1 wherein the alloy is about 1% to 10% by weight and the grains from about 90% to 99% by weight.

3. The method as defined in claim 1 wherein the base material is selected from the group of a metal and a ceramic.

4. The method as defined in claim 1 wherein the base material comprises a steel based material.

5. The method as defined in claim 1 wherein the oil is essentially free of additives.

6. The method as defined in claim 1 where the carbon film consists essentially of diamond like carbon.

7. The method as defined in claim 1 where the grains are selected from the group of refractory metal carbides, carbo-nitrides, nitrides and borides.

8. The method of claim 1, further comprising cracking carbon bonds of the oil after engaging the nanocomposite with the surface.

9. The method of claim 1, wherein the nanocomposite coating consists essentially of the microstructural matrix of the catalytically active alloy with grains embedded in the microstructural, the microstructural matrix selected from the group of Cu, Ni, Pd, Pt and Re and mixtures thereof and the grains selected from the group of transition metal carbides, transition metal nitrides, transition metal carbo-nitrides, transition metal borides, refractory metal carbides, refractory metal nitrides, refractory metal carbo-nitrides, refractory metal borides.

10. A nanocomposite coating comprising:
the nanocomposite base layer comprising a matrix of an alloy selected from the group of a Cu alloy, a Ni alloy, a Pd alloy, a Pt alloy and a Re alloy and mixtures thereof and grains selected from the group of a boride, a carbide, a carbo-nitride and a nitride; and
a carbon containing layer disposed on the nanocomposite coating, the carbon containing layer formed by disposing an oil on the nanocomposite coating and moving another metal layer against the nanocomposite base layer, thereby catalytically cracking molecules of the disposed oil to form the carbon containing layer.

11. The nanocomposite of claim 10, wherein the nanocomposite layer consists essentially of a matrix of the alloy selected from the group of a Cu alloy, a Ni alloy, a Pd alloy, a Pt alloy and a Re alloy and mixtures thereof and grains selected from the group of a boride, a carbide, a carbo-nitride and a nitride.

12. The nanocomposite of claim 10, wherein the nanocomposite base layer is about 1% to 10% by weight for the matrix and the grains from about 90% to 99% by weight.

13. The nanocomposite coating base layer as defined in claim 10 wherein the grains are selected from the group consisting essentially of transition metal carbides, nitrides, carbo-nitrides and borides.

14. The nanocomposite coating base layer as defined in claim 10 wherein the grains are selected from the group consisting essentially of refractory metal carbides, nitrides, carbo-nitrides and borides.

15. A method for lubricating materials in wear contact, comprising the steps of:
providing a base material;
disposing a nanocomposite coating on the base material, the nanocomposite comprising a microstructural matrix of a catalytically active alloy with grains embedded in the microstructural matrix, the microstructural matrix selected from the group of Cu, Ni, Pd, Pt and Re and mixtures thereof and the grains selected from the group of transition metal carbides, transition metal nitrides, transition metal carbo-nitrides, transition metal borides, refractory metal carbides, refractory metal nitrides, refractory metal carbo-nitrides, refractory metal borides;
disposing a hydrocarbon on the nanocomposite coating;
engaging the nanocomposite coating with a surface, the hydrocarbon disposed therebetween; and
forming a carbon film disposed between the coating and the surface, thereby lubricating the nanocomposite coating.

16. The method as defined in claim 15 wherein the alloy is about 1% to 10% by weight and the grains from about 90% to 99% by weight.

17. The method as defined in claim 15 wherein the base material is selected from the group of a metal and a ceramic.

18. The method as defined in claim 15 wherein the base material comprises a steel based material.

19. The method as defined in claim 15 where the carbon film consists essentially of diamond like carbon.

20. The method as defined in claim 15 where the grains are selected from the group of refractory metal carbides, carbo-nitrides, nitrides and borides.

* * * * *